United States Patent Office 3,362,444
Patented Jan. 9, 1968

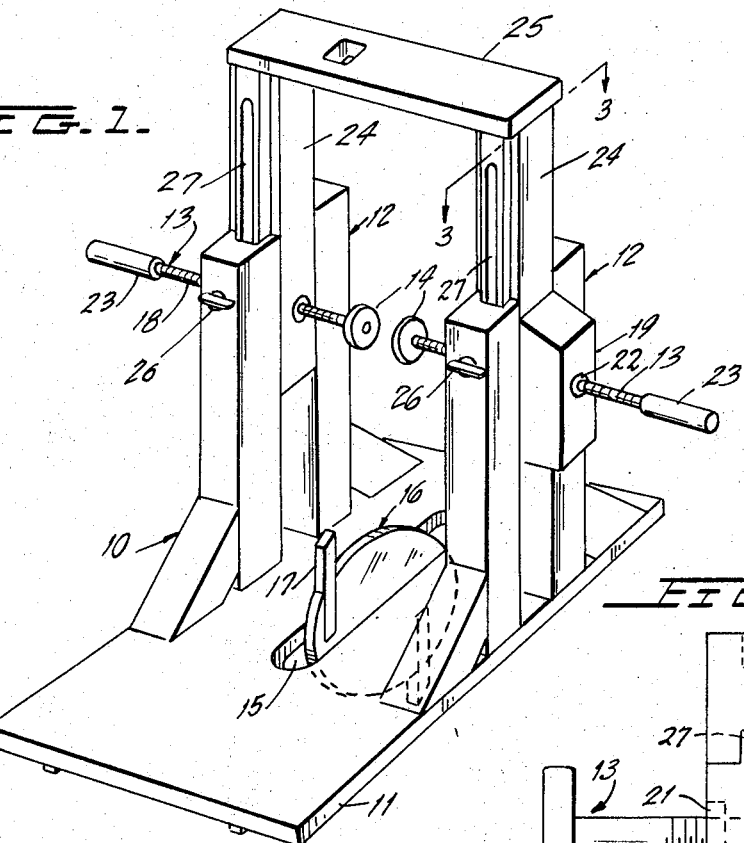
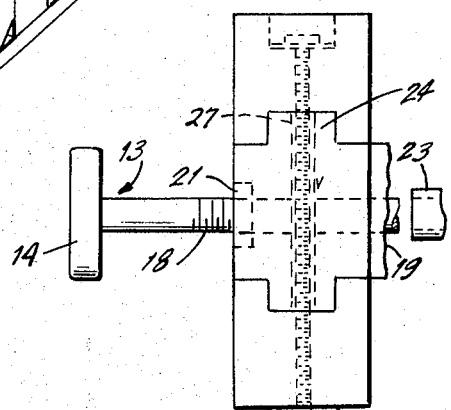
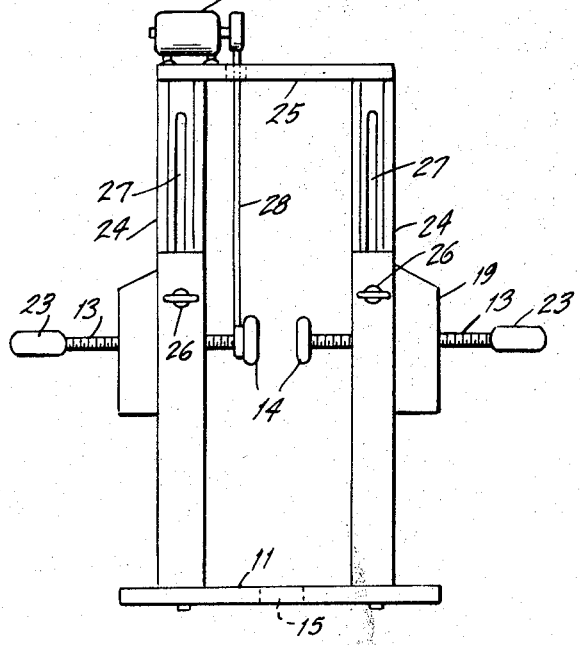

3,362,444
TURRET FOR A RADIAL CUTTER
Nicolangelo Pesola, Flushing, and Salvatore Pluchino, Bronx, N.Y., assignors to Nicolangelo Pesola, Jack A. Pesola, Dominick Pesola, and Salvatore Pluchino
Filed Oct. 22, 1965, Ser. No. 500,528
3 Claims. (Cl. 142—40)

ABSTRACT OF THE DISCLOSURE

A turret for a radial cutter to permit the formation of continuous or semi-continuous curvilinear shapes on a desired workpiece, the turret including bracket members mounted upon an apertured table top and being provided with adjustable elements which facilitate vertical, lateral and rotational movement of the workpiece relative to the cutter blade or blades.

This invention relates to a turret for a radial cutter device and more particularly to a turret ensemble which may be utilized to facilitate the formation of continuous or semi-continuous curvilinear shapes employing such a radial cutter.

Various work holding attachments for radial cutting instruments have previously been proposed to facilitate the formation of curvilinear shapes on wood or similar working pieces. Such devices are disclosed, for example, in U.S. Patents 1,804,720; 2,715,924; 2,766,785; 2,847,044; and 2,918,953. In Patent No. 2,847,044, for example, an attachment for table saws is described having a continuous threaded shaft upon which a centrally bored wooden workpiece may be fixedly mounted in a predetermined transverse position relative to the sawblade, and a pair of vertical legs provided with discrete spaced apertures in which the supporting shaft may be placed to facilitate vertical displacement of the workpiece relative to the sawblade. Such device is unsatisfactory in that the workpiece cannot readily be laterally traversed relative to the sawblade by the supporting shaft when the sawblade engages the workpiece and cannot be vertically displaced with respect to the sawblade without disassembling the ensemble and repositioning the supporting shaft and workpiece vertically of the sawblade. Moreover, such device is designed for use only with workpieces having centrally bored apertures through which the supporting shaft may extend and cannot therefore be employed in connection with a wide variety of desired workpieces.

It is accordingly among the objects of the present invention to provide an improved turret asembly for use with a radial cutter, which assembly facilitates the formation of either continuous or semi-continuous curvilinear shapes in a simple and convenient manner.

The turret assembly of the present invention comprises an apertured table top for mounting adjacent a radial cutter in a position such that the cutter blade or blades may pass through the table top aperture and thereby define one or more cutting planes extending through the table top. A pair of brackets is mounted upon the table on opposite sides of the aperture therethrough, each of such brackets supporting a lockbar which is designed for movement both toward and away from the cutting plane or planes and vertically with respect to the table top. Bearings are additionally mounted on each of the lockbars for supporting opposite sides of the desired workpiece with the cutting plane or planes passing therethrough, the bearings being continuously movable with respect to the lockbars in planes extending parallel to the cutting plane or planes to thereby permit rotation of the workpiece with respect to the cutter. The turret assembly thus facilitates either continuous vertical or lateral movement of the workpiece relative to the sawblade or other cutter to be employed, without the necessity for complete disassembly and reconstruction thereof after each adjustment. Moreover, the manifest simplicity of the turret assembly permits simple and economical use thereof in the formation of any desired curvilinear shape.

The nature and objects of the invention will be more fully apparent from a consideration of the following detailed description of preferred embodiments of the turret assembly hereof, taken in connection with the accompanying drawing, in which:

FIGURE 1 is a perspective view of the preferred form of turret assembly;

FIGURE 2 is a side elevation of an alternative form of the turret assembly;

FIGURE 3 is a plan view of one of the bracket members of the turret assembly, illustrating the position adjustment elements extending therethrough; and FIGURE 4 is a side view of one form of cutter which may be utilized in conjunction with the turret assembly hereof.

Referring to the drawing, the turret asembly 10 hereof includes a table top 11 upon which a pair of brackets 12 are mounted for supporting corresponding lockbars 13 having bearings 14 for engaging and supporting a desired workpiece. The table top 11 is provided with a suitable cutout or aperture 15 which may be positioned relative to a suitable cutter device, e.g., the molding cutter 16 (shown in detail in FIGURE 4), as to permit the cutter blade or blades 17 to pass through the table top aperture to engage the workpiece held by bearings 14 and thereby effect the formation of any desired curvilinear shapes therein.

Elements are provided in connection with each lockbar 13, to facilitate movement of such member both toward and away from the cutting plane or planes in which cutter 16 is operative, i.e., laterally of the cutter, and vertically with respect to the table top 11 and cutter 16. Lateral movement of the lockbar is insured by providing the lockbar in the form of a threaded bolt, the threads 18 of which engage mating threads provided within the body of the associated bracket 12. Each bracket includes an outer stabilizer block 19 through which the associated lockbar 13 is passed. A pair of nuts 21 are additionally threadingly engaged with each lockbar and received in recesses 22 in the corresponding stabilizer blocks, thereby stabilizing the lockbar in any predetermined lateral position.

If desired, handles 23 may also be mounted on the respective lockbars, rotation of such handles effecting translation of the lockbars relative to the associated brackets with which they are in threaded engagement. The relationship between the degree of rotation of handles 23 and the translation of the lockbars may, of course, be readily varied by appropriate choice of the pitch of threads 18 on lockbars 13 and the mating interior threads provided in brackets 12.

Vertical movement of lockbars 13 and the workpieces carried thereby, is assured by securing central bracket elements 24, in which the respective lockbars are mounted, to a turret extension 25. The turret extension and central bracket elements may be vertically, slidably displaced relative to the bodies of brackets 12 and table top 11, by threaded bolt and wing-nut assemblies 26 (see FIGURE 3). Such bolt and wing-nut assemblies may be passed through brackets 12 at any suitable vertical point, by virtue of the provision of slots 27 extending lengthwise of the central bracket element 24. In this manner continuous vertical adjustment of the position of the lockbars 13 relative to the cutter 16 may be effected.

The bearings 14 are, as indicated hereinabove, rotatable relative to the lockbars in planes parallel to the cutting plane or planes described by cutter 16. The bearings may be conventional roller bearings and may be constituted of metal, nylon or other materials capable of use for such purpose.

In operation, any desired workpiece constituted of wood, metal, rubber, plastic, mica, masonry, or the like (depending upon the particular job to be performed and the cutter device to be utilized), may be engaged between the bearings 14, and handles 23 of lockbars 13 thereafter rotated to effect firm support of the workpiece between such lockbars. The composite assembly may then be laterally translated to any desired position relative to cutter 16 merely by further rotation of handles 23. After loosening bolt and nut assemblies 26 the turret extension 25 and the integral central bearing elements 24 carrying lockbolts 13 may be slidably adjusted to dispose the workpiece in its desired vertical position relative to cutter 16. After again tightening assemblies 26, the cutter 16 may be actuated to form continuous or semi-continuous contours on the workpiece, as may be desired. Employing the embodiment of FIGURE 1, the workpiece may be manually rotated, depending on the contour to be produced. The workpiece may also be displaced either laterally or vertically for further contour formation by simply adjusting the lockbar positioning elements in the manner described hereinabove.

In the alternative embodiment illustrated in FIGURE 2, rotation of the bearings 14, and hence the workpiece supported thereby, is effected by a mechanical drive. Such a drive may, for example, incorporate a pulley drive 28, one pulley wheel of which is fastened to one of bearings 14, and a motor 29, the shaft of which drives the other pulley wheel of drive 28. Such embodiment may be utilized when it is desired to automatically rotate the workpiece relative to the cutter element, rather than manually determine the contour of the desired shapes formed.

The molding cutter illustrated in FIGURES 1 and 4 of the drawing incorporates three separate blades, the number and shape of which, it will be understood, could readily be modified. It is further intended that any other hand or motor driven cutter devices for effecting conventional mechanical functions, e.g., notching, scoring, etching, rabbeting, dadoing, turning, chiseling, marking, sanding, planing, mortising, tenoning, routing, scrolling, scribing, or the like, may be utilized in association with the turret ensemble of the present invention in place of the molding cutter illustrated.

Internal or external gearing, or any other mechanical means of moving a section, or sections, may also be associated with the turret extension so as to mechanically, electrically, or otherwise automatically raise or lower the same to any desired position, without necessitating the use of bolt and nut assemblies 26, described in connection with the preferred embodiment referred to above.

We claim:
1. A turret for use with a radial cutter to facilitate forming continuous or semi-continuous curvilinear shapes with the cutter, said turret comprising:
 (a) an apertured table top for mounting adjacent the cutter so positioned as to permit the cutter blade or blades to pass through the table aperture, the cutter thereby defining one or more cutting planes extending through the table top;
 (b) a pair of brackets mounted on the table top on opposite sides of the aperture therethrough for supporting a workpiece above said aperture while facilitating vertical and/or lateral movement of the workpiece relative to the cutting plane or planes, each of said brackets comprising:
  (1) a pair of outer supporting elements spaced from one another lengthwise of said aperture and having a pair of aligned bores defining a first passageway extending therethrough substantially parallel to said cutting plane or planes,
  (2) an inner central bracket element frictionally engageable between said outer supporting elements for positioning at a plurality of vertical positions relative to the supporting elements, said central bracket element having an elongated slot extending therethrough substantially parallel to said cutting plane or planes, varying sections of which slot are aligned with and define a portion of said first pasageway in the several positions of said central bracket element, and said element having an internally threaded second passageway extending therethrough substantially perpendicular to said cutting plane or planes;
 (c) nut and bolt assemblies mounted in said first passageways for frictionally engaging and locking the inner central element to the outer supporting elements of each said bracket to thereby position said inner elements in a plurality of predetermined vertical positions;
 (d) lockbars threadedly engaged with and extending through said second passageways and nuts engageable with the threaded lockbars adjacent said brackets for positioning the lockbars in predetermined lateral positions relative to said cutting plane or planes; and
 (e) bearings mounted on the inner ends of said lockbars above the table aperture for supporting opposite sides of the desired workpiece with said cutting plane or planes passing therethrough, said bearings being continuously movable relative to the lockbars in planes extending substantially parallel to said cutting plane or planes to permit rotation of the workpiece with respect to the cutter.

2. The turret of claim 1, further including drive means attached to at least one of said bearings for rotating the bearing and the workpiece engaged thereby relative to said lockbars, and a motor for actuating said drive means.

3. The turret of claim 1, in which the inner central bracket elements of said pair of brackets are mounted to a common turret extension to facilitate concurrent vertical positioning of the lockbars mounted to the respective bracket elements.

References Cited

UNITED STATES PATENTS 2,363,869  11/1944  Karish _____ 142—55 X
2,847,044  8/1958  Anderson _____ 143—171

DONALD R. SCHRAN, *Primary Examiner.*